US009308696B2

(12) United States Patent
Wu

(10) Patent No.: US 9,308,696 B2
(45) Date of Patent: Apr. 12, 2016

(54) RETROREFLECTIVE SHEET STRUCTURE

(71) Applicant: Avery Dennison Corporation, Pasadena, CA (US)

(72) Inventor: Feng Wu, Lake Zurich, IL (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/042,032

(22) Filed: Sep. 30, 2013

(65) Prior Publication Data
US 2014/0027936 A1 Jan. 30, 2014

Related U.S. Application Data

(60) Continuation of application No. 13/439,133, filed on Apr. 4, 2012, now abandoned, which is a division of application No. 11/915,390, filed as application No. PCT/US2006/022173 on Jun. 7, 2006, now Pat. No. 8,177,374.

(60) Provisional application No. 60/691,338, filed on Jun. 16, 2005.

(51) Int. Cl.
*G02B 5/124* (2006.01)
*B29D 11/00* (2006.01)
*G09F 13/16* (2006.01)
*B29C 59/02* (2006.01)

(52) U.S. Cl.
CPC ...... *B29D 11/00625* (2013.01); *B29D 11/0074* (2013.01); *B29D 11/00605* (2013.01); *G02B 5/124* (2013.01); *G09F 13/16* (2013.01); *B29C 59/022* (2013.01); *B29C 2059/023* (2013.01); *Y10T 156/11* (2015.01); *Y10T 428/24802* (2015.01)

(58) Field of Classification Search
USPC ................................................. 359/529–533
See application file for complete search history.

(56) References Cited

U.S. PATENT DOCUMENTS 1,906,655 A * 5/1933 Stimson ........................ 65/362
3,332,327 A * 7/1967 Heenan ......................... 404/16
(Continued)

FOREIGN PATENT DOCUMENTS

| CN | 1316059 | 5/2007 |
| EP | 0171975 | 12/1990 |

(Continued)

OTHER PUBLICATIONS

Raymond Serway, Physics for Scientists and Engineers vol. 2, 1074-1076 (4th ed. Philadelphia, 1999) at 1075.
(Continued)

*Primary Examiner* — Jennifer L. Doak
(74) *Attorney, Agent, or Firm* — Avery Dennison Corporation

(57) ABSTRACT

A retroreflective sheet structure (10) comprising a transparent layer (20) having a front light-receiving surface (30) and a rear retroreflecting surface (32). Light incident on the front surface (30) will pass through the layer (20), impinge on the rear retroreflective surface (32) and reflect back out through the front surface (30) in a predetermined direction. An identifying indicia (44) is chosen and then formed on the retroreflecting surface (32). This indicia (44) can be used for identification purposes, even years after an end product incorporating the reflective sheet structure (10) has been out in the field.

16 Claims, 4 Drawing Sheets

(56) References Cited

U.S. PATENT DOCUMENTS

| | | | |
|---|---|---|---|
| 3,541,606 A * | 11/1970 | Heenan et al. | 359/533 |
| 3,833,285 A * | 9/1974 | Heenan | 359/551 |
| 3,873,184 A * | 3/1975 | Heenan | 359/533 |
| 3,923,378 A * | 12/1975 | Heenan | 359/530 |
| 3,989,775 A * | 11/1976 | Jack et al. | 264/1.9 |
| 4,200,875 A * | 4/1980 | Galanos | 347/224 |
| 4,645,301 A * | 2/1987 | Orensteen et al. | 380/54 |
| 4,650,283 A * | 3/1987 | Orensteen et al. | 359/537 |
| 4,688,894 A * | 8/1987 | Hockert | 359/537 |
| 4,691,993 A * | 9/1987 | Porter et al. | 359/537 |
| 4,775,219 A * | 10/1988 | Appeldorn et al. | 359/532 |
| 4,919,741 A * | 4/1990 | Chirhart et al. | 156/223 |
| 4,972,061 A * | 11/1990 | Duley et al. | 219/121.66 |
| 5,056,880 A * | 10/1991 | Barbanell | 359/29 |
| 5,151,572 A * | 9/1992 | Jack | 219/121.69 |
| 5,169,707 A * | 12/1992 | Faykish et al. | 428/195.1 |
| 5,189,531 A * | 2/1993 | Palmer et al. | 359/3 |
| 5,310,436 A * | 5/1994 | Pricone et al. | 156/209 |
| 5,376,314 A * | 12/1994 | Share et al. | 264/400 |
| 5,585,144 A * | 12/1996 | Waitts | 427/258 |
| 5,592,330 A * | 1/1997 | Bernard | 359/529 |
| 5,620,613 A * | 4/1997 | Olsen | 216/24 |
| 5,780,140 A * | 7/1998 | Nilsen | 428/172 |
| 5,815,292 A * | 9/1998 | Walters | 359/2 |
| 5,822,119 A * | 10/1998 | Rasmussen et al. | 359/515 |
| 5,885,677 A * | 3/1999 | Gosselin et al. | 428/40.1 |
| 5,915,855 A * | 6/1999 | Murase et al. | 40/546 |
| 5,940,212 A * | 8/1999 | Johnson et al. | 359/529 |
| 6,001,210 A * | 12/1999 | Ayres | 156/257 |
| 6,119,751 A * | 9/2000 | Nilsen et al. | 156/384 |
| 6,120,636 A * | 9/2000 | Nilsen et al. | 156/230 |
| 6,135,350 A * | 10/2000 | White et al. | 235/380 |
| 6,217,175 B1 * | 4/2001 | Wong et al. | 359/534 |
| 6,288,842 B1 * | 9/2001 | Florczak et al. | 359/619 |
| 6,411,029 B1 * | 6/2002 | Czak | 313/509 |
| 6,440,334 B2 * | 8/2002 | Currens et al. | 264/1.34 |
| 6,484,637 B2 * | 11/2002 | Lewis | 101/456 |
| 6,500,526 B1 * | 12/2002 | Hannington | 428/195.1 |
| 6,544,634 B1 * | 4/2003 | Abrams et al. | 428/212 |
| 6,592,967 B2 * | 7/2003 | Kaufman | 428/156 |
| 6,641,270 B2 * | 11/2003 | Hannington et al. | 359/536 |
| 6,644,818 B2 * | 11/2003 | Sloot | 359/530 |
| 6,683,710 B2 * | 1/2004 | Hoffman et al. | 359/256 |
| 6,767,102 B1 * | 7/2004 | Heenan et al. | 359/530 |
| 6,786,513 B1 * | 9/2004 | Cobben et al. | 283/72 |
| 7,033,677 B2 | 4/2006 | Busch et al. | |
| 2001/0018128 A1 * | 8/2001 | Hannington et al. | 428/439 |
| 2001/0047846 A1 * | 12/2001 | Currens et al. | 156/209 |
| 2002/0002731 A1 * | 1/2002 | Lin | 2/422 |
| 2002/0002732 A1 * | 1/2002 | Lin | 2/422 |
| 2002/0071940 A1 * | 6/2002 | Arnold et al. | 428/195 |
| 2002/0110667 A1 * | 8/2002 | Kaufman | 428/141 |
| 2002/0186472 A1 * | 12/2002 | Sloot | 359/530 |
| 2003/0079387 A1 * | 5/2003 | Derose | 40/544 |
| 2003/0151815 A1 * | 8/2003 | Hannington et al. | 359/536 |
| 2003/0173717 A1 * | 9/2003 | Abrams et al. | 264/496 |
| 2003/0216510 A1 * | 11/2003 | Wanat et al. | 525/70 |
| 2005/0258637 A1 * | 11/2005 | Bi et al. | 283/91 |
| 2008/0212181 A1 * | 9/2008 | Wu | 359/530 |

FOREIGN PATENT DOCUMENTS

| | | |
|---|---|---|
| EP | 1103914 | 5/2001 |
| JP | 2004-141031 | 5/2004 |
| WO | 99/23516 | 5/1999 |

OTHER PUBLICATIONS

International Preliminary Report on Patentability issued in corresponding IA No. PCT/US2006/022173 dated Jul. 25, 2007.
International Search Report and Written Opinion issued in corresponding IA No. PCT/US2006/022173 dated Oct. 4, 2006.
Article 19 Amendments filed in corresponding IA No. PCT/US2006/022173 dated Dec. 1, 2006.
Response to the Written Opinion filed in corresponding IA No. PCT/US2006/022173 dated Jan. 3, 2007.

* cited by examiner

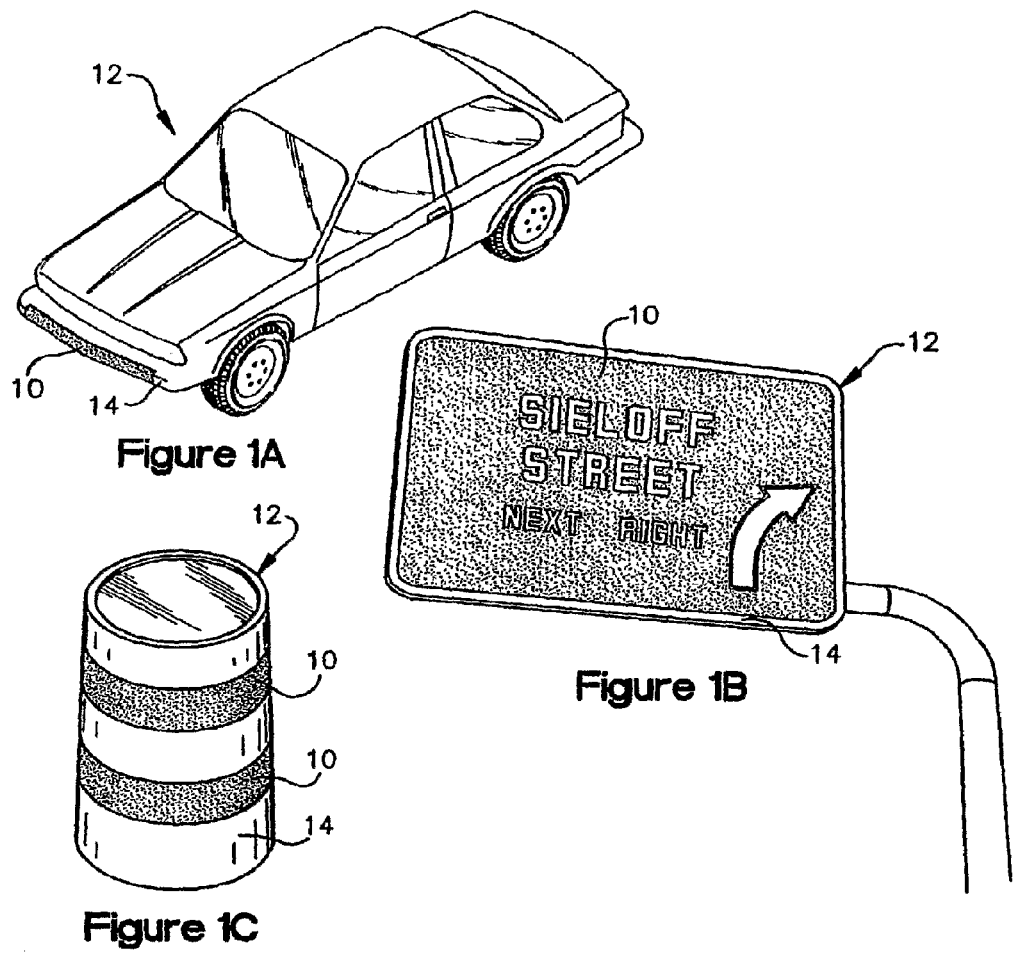
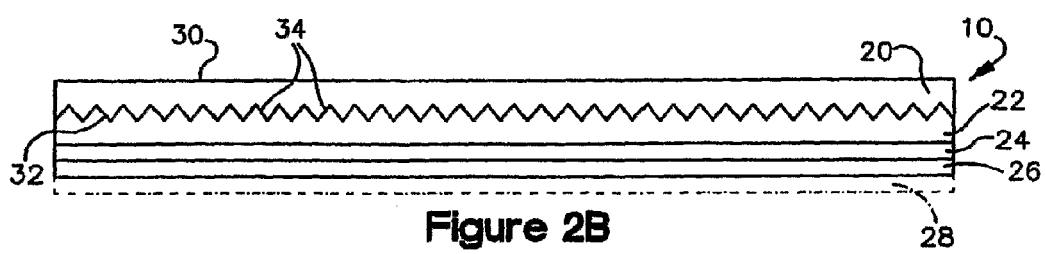
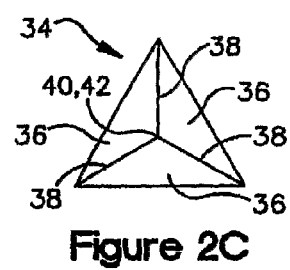 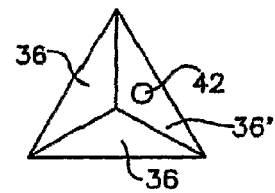

RETROREFLECTIVE SHEET STRUCTURE

CROSS-REFERENCE TO RELATED APPLICATIONS

The present application is a continuation of U.S. application Ser. No. 13/439,133 filed Apr. 4, 2012, which is a division of U.S. application Ser. No. 11/915,930 filed Nov. 26, 2007, which is a 371 of International Application No. PCT/US2006/022173 filed Jun. 7, 2006, which claims priority to U.S. Provisional Application No. 60/691,338 filed Jun. 16, 2005, all of which are incorporated herein by reference in their entireties.

FIELD OF THE INVENTION

This invention relates generally, as indicated, to a retroreflective sheet structure and, more particularly, to a retroreflective sheet structure comprising a transparent thermoplastic layer with a front light-receiving surface and a rear retroreflecting surface.

BACKGROUND OF THE INVENTION

A retroreflective sheet structure comprises a transparent thermoplastic layer having a front light-receiving surface and a rear retroreflecting surface. Light incident on the front surface passes through the clear thermoplastic layer, impinges on the rear retroreflecting surface, and is reflected back out through the front surface in a predetermined direction (e.g., aligned with and/or parallel to the direction of incidence). In this manner, incident light can be used to illuminate markings, words, and other information in an otherwise dark environment.

The retroreflecting surface can be formed by a repeating array of retroreflective elements embossed in the thermoplastic layer. The retroreflective elements can comprise, for example, corner-cube elements which each have three flat faces arranged mutually at right angles and connected by edges which join at an apex. (See e.g., U.S. Pat. No. 1,906,655, U.S. Pat. No. 3,332,327, U.S. Pat. No. 3,541,606, U.S. Pat. No. 3,833,285, U.S. Pat. No. 3,873,184, and/or U.S. Pat. No. 3,923,378. See also, U.S. Pat. No. 6,767,102 which is assigned to the assignee of the present invention and the entire disclosure which is hereby incorporated by reference).

Over the years, retroreflective sheet structures have been incorporated into a wide range of end products including, for example, vehicle markings, highway signs, and construction barrels. In these and other applications, extended outdoor durability is important and the retroreflective sheet structure needs to withstand extended sun light exposure and other harsh environmental conditions. An expected useful life of twelve years is not considered an unreasonable requirement when a retroreflective structure is being used in a highway situation. Even in less demanding, more delicate settings, the retroreflective structure is expected to maintain its physical stability and optical reflectivity for a certain period of time (e.g., one to five years).

Typically, an end product manufacturer will receive a roll of retroreflective sheeting from an independent supplier. During the manufacture of the end product, the sheeting is unwound from the roll and separated into individual structures for integration into the end product. As such, a retroreflective sheeting supplier may be unaware of what end products its sheeting is being used in and/or where the end product is being used, especially after an extended period of time. Additionally or alternatively, an end product manufacturer having a plurality of sheeting suppliers (which is dictated by many companies' purchasing policies) may find it difficult to track the identify of the supplier whose sheeting was used in a particular end product.

SUMMARY OF THE INVENTION

The present invention provides a retroreflective sheet structure including indicia that can be used to identify something about the sheeting used to form the structure. For example, the identifying indicia can allow a sheeting supplier to determine whether a specific retroreflective structure originated from its company and/or an end product manufacture to determine what suppliers' sheeting was incorporated into a particular product. This may be important, for example, should a retroreflective structure not maintain its physical stability and/or optical reflectivity for an expected period of time. The present invention allows such a determination, even years after the end product incorporating the reflective sheet structure has been out in the field.

More particularly, the present invention provides a retroreflective sheet structure comprising identifying indicia formed on the rear retroreflecting surface of its transparent layer. A supplier can choose an identifying indicia that will not be used by another sheeting supplier. The identifying indicia is detectable during close inspection (e.g., within 20 cm or less), but does not interfere with the retroreflective qualities of the structure.

The rear retroreflecting surface can comprise a repeating array of retroreflective elements formed thereon, with some of the elements having disturbances arranged in a pattern corresponding to the identifying indicia. For example, if the retroreflective elements are microcubes, a small percentage of the cube faces can have a planar-disturbance thereon. Forming the identifying indicia in this manner allows an existing tool plate (having only undisturbed retroreflective elements) to be modified to practice the invention. Specifically, for example, the existing tool plate can be etched (e.g., laser etched) to create the inverse of the desired planar-disturbances.

These and other features of the invention are fully described and particularly pointed out in the claims. The following description and drawings set forth in detail a certain illustrative embodiment of the invention which is indicative of but one of the various ways in which the principles of the invention may be employed.

DETAILED DESCRIPTION OF THE DRAWINGS

FIGS. 1A, 1B, and 1C are schematic drawings of end products which incorporate a retroreflective sheet structure according to the present invention, the end products being a vehicle, a highway sign, and a construction barrel, respectively.

FIGS. 2A and 2B are top and side views, respectively, of the retroreflective sheet structure isolated from the end product.

FIG. 2C is a close-up bottom view of a retroreflective element.

FIG. 2D is a close-up bottom view of a retroreflective element with a planar disturbance on one of its faces.

DETAILED DESCRIPTION OF THE EMBODIMENTS

Figure 2A:
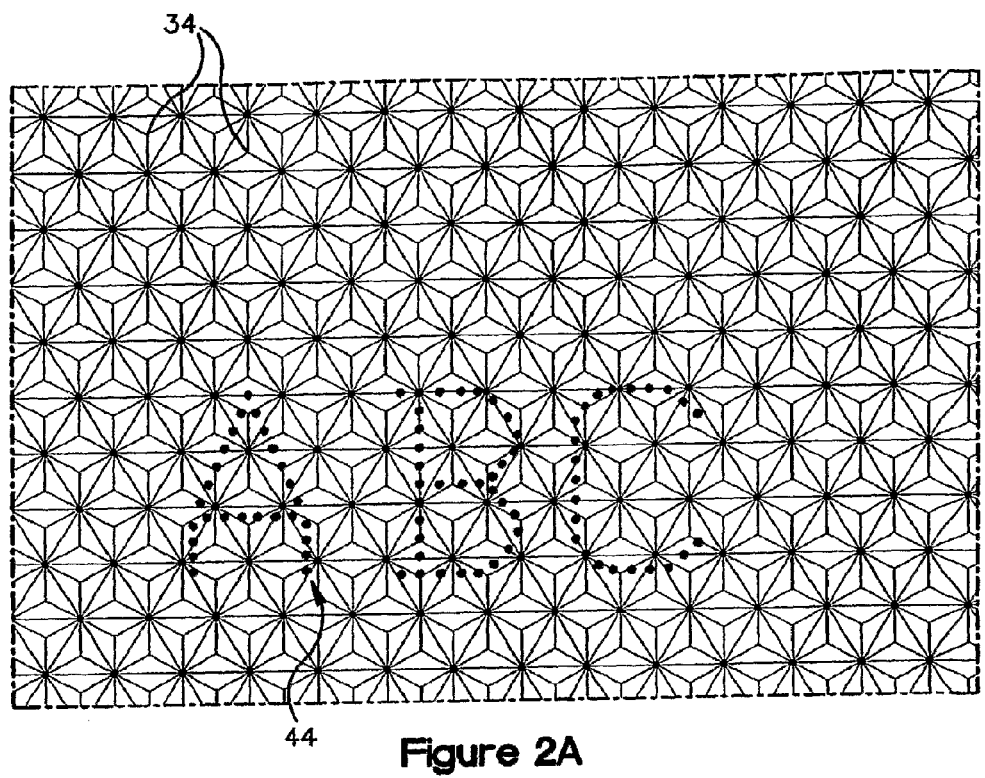

Referring now to the drawings, and initially to FIGS. 1A, 1B, and 1C, a retroreflective sheet structure 10 according to the present invention is shown incorporated into an end product 12. In the illustrated embodiments, the end products 12 are a vehicle, a highway sign, and a construction barrel, respectively. With these end products 12, extended outdoor durability is important and the sheet structure 10 needs to withstand extended sun light exposure and other harsh environmental conditions for an expected period of time. However, the present invention is not limited to outdoor situations, and the end product 12 can be any product which incorporates the retroreflective sheet structure 10 according to the present invention. In any event, the end product 12 includes a mounting surface 14 to which the sheet structure 10 is attached and, preferably, adhesively attached.

Referring now to FIGS. 2A and 2B, the retroreflective sheet structure 10 is shown isolated from the end product 12. The structure 10 comprises a transparent layer 20, a reflection-aiding layer 22, a backing layer 24, and an adhesive layer 26. A removable release layer 28 (shown in phantom) can be provided to cover the adhesive layer 26 during pre-mounting stages of end product fabrication.

The transparent layer 20 can comprise any suitable thermoplastic material which is compatible with desired manufacturing methods (e.g., acrylic, vinyl, polymethylacrylate, polycarbonate, polyurethane, polysulfone, polyarylate, polyether imide, polyetherimide, cyclo-olefinic copolymer, and/or acrylonitrile butadiene styrene). The reflection-aiding layer 22 can be a metallized film, granular silica particles, or any other acceptably reflective material. The backing layer 24 can serve as a space-filler behind the layers 20/22 and/or as a carrier for the adhesive layer 26 and, to this end, can comprise a paper, plastic, metal, or other sheet/substrate which performs these functions. The adhesive layer 26 is used to attach the reflective sheet structure 10 to the mounting surface 14 of the end product 12 and can comprise a pressure-sensitive or heat-activated adhesive.

The transparent layer 20 has a front light-receiving surface 30 and a rear retroreflective surface 32 on which a repeating array of retroreflective elements 34 are formed. Light incident on the smooth front surface 30 passes through the clear thermoplastic layer 20, impinges on the retroreflective elements 34, and is reflected back out through the front surface 30 in a predetermined direction (e.g., aligned with and/or parallel to the direction of light incidence).

As is best seen in FIG. 2C, the retroreflective elements 34 are preferably microcubes which each comprise a three flat faces 36 arranged mutually at right angles and connected by edges 38 that meet an apex 40. The size, shape and arrangement of the faces 36 determines, and can be varied to adjust, optical qualities. The cube area of each retroreflective element 34 (i.e., the area enclosed by the cube shape defined by pyramid of the perimeter of the three faces 36 in the direction of the principle refracted ray) can be about 1 mm.sup.2 or less.

In a large majority of the retroreflective elements 34 (e.g., more than 80%, more than 90%, more than 95%, and/or more than 98%), the three faces 36 are planar without any outthrusts or depressions. (See FIG. 2D.) However, in a selected few of the retroreflective elements 34, one face 36 includes a planar-disturbance 42 which disrupts the planar profile of the face 36. (See FIG. 2E.) The retroreflective elements 34 having a planar-disturbance 42 are arranged in a pattern corresponding to an identifying indicia 44. For example, in the illustrated embodiment, the planar disturbances 42 collectively form an "ABC" logo which could correspond to the supplier of a retroreflective sheeting (namely retroreflective sheeting 48, introduced below) used to fabricate the structure 10. It is expected that a supplier will choose the identifying indicia 44 so that will not be another sheeting supplier.

In the illustrated embodiment, the planar-disturbance 42 is a protrusion and, more particularly, a protuberance having a knob-like shape. However, other protrusion geometries are certainly possible with, and contemplated by, the present invention. Moreover, other disturbances in the planar profile of the selected faces 36 could be used instead of, or in addition to, the protuberances 42. For example, indentations, notches, pits, depressions or other recesses could be used to form the identifying indicia 44. The planar-disturbances 42 can be same, similar, or different among the "disturbed" retroreflective elements 34.

The planar-disturbance 42 will occupy only a small percentage (e.g., less than 30%, less than 20%, less than 10%, and/or less than 5%) of the surface area of the disturbed face 36 of the respective retroreflective element 24. Thus, most the reflective regions of the disturbed faces 36 are left intact. Moreover, the identifying indicia 44 collectively formed by the disturbances 42 will preferably occupy an area of less than 16 cm.sup.2 on the surface 32 of the thermoplastic layer 20. In this manner, the identifying indicia 44 will be detectable during close inspection (i.e., within 20 cm or less of the structure 10), but will not interfere with, or detract from, the retroreflective qualities of the structure 10. That being said, larger identifying indicia 44 could be used if such interference and/or detraction is acceptable or desired in a particular situation.

Figure 3:
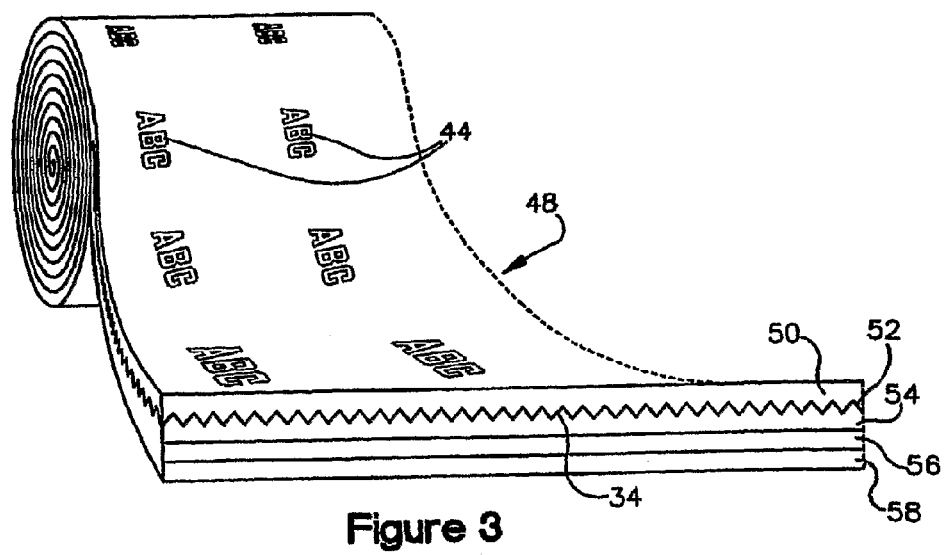
FIG. 3 is a perspective view of a roll of retroreflective sheeting which would be supplied to an end product manufacturer for fabrication into the retroreflective sheet structure, the sheeting including an embossed thermoplastic layer.

Referring now to FIG. 3, retroreflective sheeting 48 is shown which can be used to create a plurality of the structures 10. Typically, a manufacturer of the end product 12 (or of subassemblies therefor) will receive a roll of the retroreflective sheeting 48 from an independent supplier. During the manufacture of the end product 12, the sheeting 48 is unwound from the roll and separated into individual structures 10 for integration into the end product 12. To this end, the sheeting 48 can comprise a transparent thermoplastic layer 50, a reflection-aiding layer 52, a backing layer 54, an adhesive layer 56, and a removable release layer 58. The transparent layer 50 includes the repeating array of retroreflective elements 34 and includes the identifying indicia 44 at predetermined positions and/or intervals to insure that each structure 10 includes at least one such indicia 44.

Figure 4A:
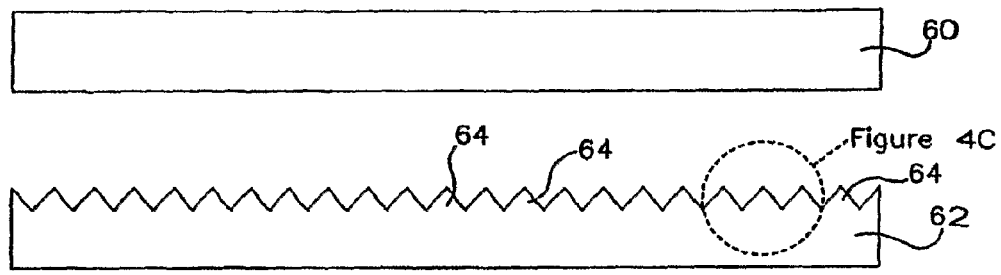
FIGS. 4A and 4B are schematic views of a method of embossing the thermoplastic layer.
Figure 4B:
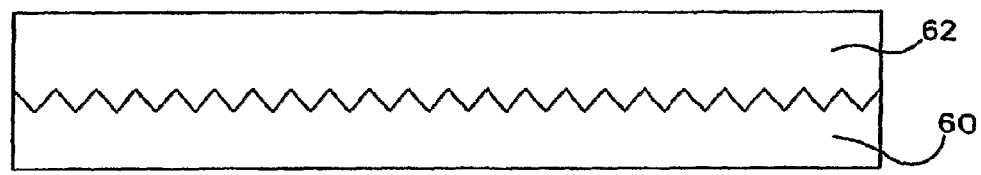

Referring now to FIGS. 4A and 4B, a method of making the thermoplastic layer 50 is schematically shown. In this method, a thermoplastic film 60 is embossed by a tool plate 62, and then cooled to solidify the embossed microstructure. The tooling plate 62 used in this method can be a variety of sizes with widths/lengths ranging from, for example, five inches to sixty inches. For example, the tooling plate 62 can be thirty inches wide and sixty inches long, or it can be five inches wide and five inches long.

Figure 4C:
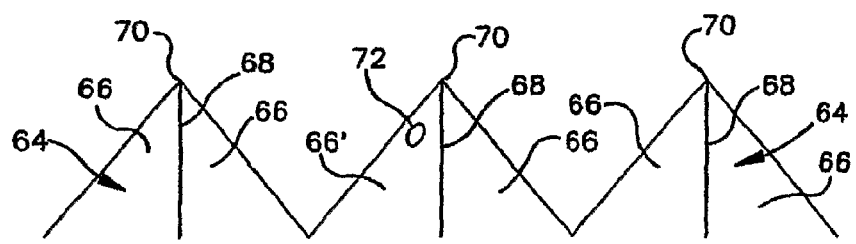
FIG. 4C is a close-up side view of a pyramid projection of the tooling plate used in the method of embossing the thermoplastic layer.
Figure 5A:
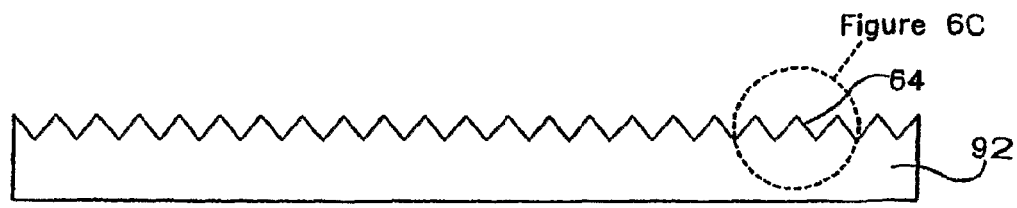
FIGS. 5A and 5B are schematic views of a method of modifying a tooling plate to emboss the thermoplastic layer.
Figure 5B:
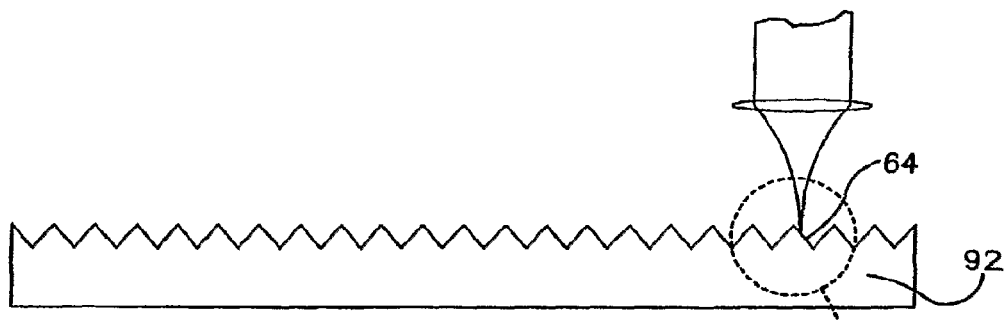
Figure 5C:
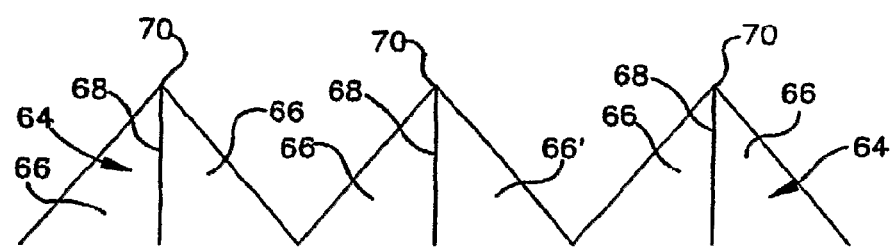
FIG. 5C is a close-up side view of a pyramid portion of the tooling prior to laser etching.
Figure 5D:
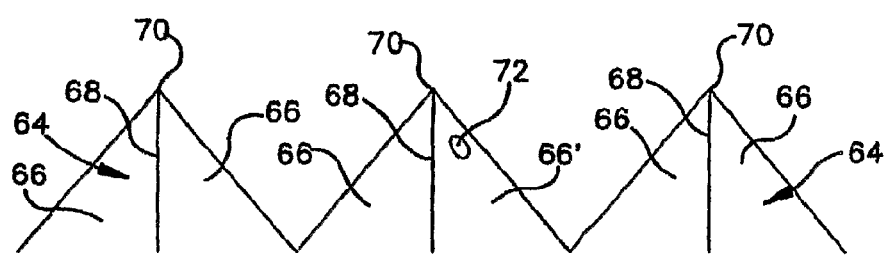
FIG. 5D is a close-up side view of a pyramid portion of the tooling after laser etching.

As is best seen by referring to FIG. 4C, the tool plate 62 has a topography corresponding to the inverse of the retroreflective elements 34. Specifically, the tool plate 62 has a series of pyramid (or other polyhedron) projections 64 comprising three faces 66 arranged at mutually right angles and connected by edges 68 which join at an apex 70. The majority of the faces 66 of the tool plate 62 have flat planar profiles to produce retroreflective elements 34 with three planar faces 36 without any out-thrusts or depressions. However, the faces 66' of the tool plate 62 intended to collectively form the identifying indicia 44 include a disturbance 72 corresponding to the inverse of the intended planar-disturbance 42. Thus, if the intended geometry of the disturbance 42 is a protrusion, as shown, the disturbance 72 will be a depression. (Likewise, if the intended geometry of the disturbance 42 was a recess, the disturbance 72 would be a projection.)

Referring now to FIG. 5, a method of making the tooling plate 62 is schematically shown. In this method, a tooling plate 92 is provided in which has a topography corresponding to the retroreflective elements 34 all having three flat planar faces 36. (FIG. 5A.) Specifically, for example, the tooling plate 92 could comprise a series of pyramid projections 64 comprising three flat face sections 66 arranged at mutually right angles and connected by edges 68 which all join at an apex 70. After identifying indicia 44 has been chosen, and the location of the indicia 44 relative to the overall thermoplastic layer is determined, the face sections 66' that correspond to the location of the planar-disturbances 72 can be charted.

The planar-disturbance 72 is then formed on each charted face section 66' by a suitable technique such as the application of energy, chemicals, or machining. For example, a laser beam (e.g., a YAG pulse laser or a CO.sub.2 laser) can be focused on the face section 66' to melt the surface and form the disturbance 72. Chemicals can be particularly useful with a plastic material, in that the application of a drop of solvent on the charted face section can cause the surface to pucker to form the disturbance 72. Machining methods can include, for example, micro-drilling.

Advantageously, the present invention does not require the construction of a new tooling plate 62, but rather allows the retrofitting an existing plate 92.

One may now appreciate that the present invention provides a retroreflective sheet structure 10 wherein the identifying indicia 44 allows a sheeting supplier to determine whether a particular structure originated from its company and/or an end product manufacture to determine what suppliers' sheeting was incorporated into a particular end product. Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A method of making a transparent layer (50) that has a front-light receiving surface (30) and a rear retroreflective surface (32) that includes a repeating array of retroreflective elements (34) and identifying indicia (44) at predetermined positions and/or intervals for retroreflective sheeting (48), said method comprising the steps of:
embossing a thermoplastic film (60) with a tool plate (62); and
cooling the embossed thermoplastic film (60);
wherein the tool plate (62) has a topography corresponding to the inverse of the retroreflective elements (34) and identifying indicia (44) and includes a series of polyhedron projections (64), the polyhedron projections are pyramids each having three faces (66) arranged at mutually right angles and connected by edges (68) which join at an apex (70), where the majority of faces (66) have flat planar surfaces and at least some of the remaining faces (66) have a tool plate disturbance formed thereon.

2. The method of claim 1 wherein the tool plate has a length in the range of about 5 inches to 60 inches.

3. The method of claim 1 wherein the tool plate has a width in the range of about 5 inches to 60 inches.

4. The method of claim 1 wherein the majority of retroreflective elements (34) are planar without any outthrusts or depressions.

5. The method of claim 1 wherein one face (36) of at least some of the retroreflective elements (34) have planar disturbances (42).

6. The method of claim 5 wherein the planar disturbances (42) correspond to the identifying indicia (44).

7. The method of claim 1 wherein the tool plate disturbance disturbances (72) corresponds to the inverse of an intended planar disturbance (42) of the retroreflective elements (34).

8. The method of claim 1 wherein the disturbance (72) is a depression.

9. The method of claim 1 wherein the disturbance (72) is a projection.

10. The method of claim 5 wherein most of the disturbed face (36) reflective regions remain intact.

11. The method of claim 1 wherein the identifying indicia (44) becomes visually detectable at an inspection distance of about 20 cm or less.

12. A method of making a transparent layer (50) that has a front-light receiving surface (30) and a rear retroreflective surface (32) that includes a repeating array of retroreflective elements (34) and identifying indicia (44) at predetermined positions and/or intervals for retroreflective sheeting (48), said method comprising the steps of:
embossing a thermoplastic film (60) with a tool plate (62); and
cooling the embossed thermoplastic film (60);
wherein the tool plate (62) has a topography corresponding to the inverse of the retroreflective elements (34) and identifying indicia (44);
wherein the identifying indicia (44) will not interfere with or detract from the retroreflective qualities of the structure retroreflective sheeting (48).

13. The method of claim 12, wherein the majority of retroreflective elements (34) are planar without any outthrusts or depressions; and wherein one face of at least some of the retroreflective elements (34) have planar disturbances (42).

14. The method of claim 12, wherein the topography of the tool plate (62) comprises a series of polyhedron projections (64); wherein the polyhedron projections are pyramids having three faces (66) arranged at mutually right angles and connected by edges (68) which join at an apex (70); wherein a majority of the faces (66) have flat planar surfaces; and wherein some of the faces (66) have a disturbance formed thereon.

15. The method of claim 14, wherein the disturbance is a depression.

16. The method of claim 14, wherein the disturbance is a projection.

* * * * *